United States Patent [19]
Guffens et al.

[11] 4,321,162
[45] Mar. 23, 1982

[54] PROCESS FOR THE PREPARATION OF AN ELECTRICALLY CONDUCTING THERMOPLASTIC ELASTOMER

[75] Inventors: Joseph H. M. Guffens, Geleen; Christiaan A. Van Gunst, Sittard, both of Netherlands

[73] Assignee: Stamicarbon, B.V., Geleen, Netherlands

[21] Appl. No.: 835,894

[22] Filed: Sep. 23, 1977

[30] Foreign Application Priority Data

Sep. 25, 1976 [NL] Netherlands .......................... 7610673

[51] Int. Cl.$^3$ .............................................. H01B 1/06
[52] U.S. Cl. .................... 252/511; 524/495; 524/474
[58] Field of Search ...................... 252/511; 260/42.46

[56] References Cited

U.S. PATENT DOCUMENTS 3,963,647  6/1976  Straub .................................. 252/511
4,002,595  1/1977  Adelman .............................. 252/511

FOREIGN PATENT DOCUMENTS 127197  11/1944  Australia .............................. 252/511

OTHER PUBLICATIONS

Armak Product Data Bulletin No. 75-79, Kejjenblack® EC Highly Conductive Carbon Black, 1975.
*Fillers and Reinforcements for Plastics,* Rudolph D. Deanin and Nick R. Schott, (Eds.), 1974, pp. 175-177.

Primary Examiner—J. L. Barr
Attorney, Agent, or Firm—Cushman, Darby & Cushman

[57] ABSTRACT

A process for the preparation of an electrically conducting, thermoplastic elastomer mixture is disclosed, wherein a mixture is made of 100 parts of rubbery ethene-copolymer, 25 to 250 parts of crystalline propene-polymer and 1 to 25 parts of a carbon black with an oil (DBP) absorption of over 150 ml/100 g and a porosity index of over 100 m$^2$/g. A good balance between conductivity and processability is achieved, especially if the ratio between the amount of crystalline propene polymer and the amount of carbon black is greater than 6 or preferably greater than 10 and/or some oil is incorporated in the mixture. The mixture can be used for the manufacturing of cables and moulded articles.

18 Claims, No Drawings

PROCESS FOR THE PREPARATION OF AN ELECTRICALLY CONDUCTING THERMOPLASTIC ELASTOMER

The present invention relates to a process for the preparation of an electrically conducting, thermoplastic elastomer mixture that contains a rubbery copolymer of ethene, a higher α-alkene and, if so desired, one or more polyenes, a substantially crystalline propane polymer and carbon black.

A process of this type is known from the German Offenlegungsschrift No. 2,536,831. According to this publication an electrically conducting mixture can be prepared by incorporating a comparatively large amount of a special type of carbon black in the mixture. Calculation by means of the formulas mentioned shows that the minimum amount of carbon black is about 17.5 parts per 100 parts of rubbery copolymer. This carbon black must moreoever meet some specific requirements, i.a. the oil absorption must be between 40 and 130 cm$^3$ per 100 grams. It appears from the examples that the amounts of carbon black used are 25 and 40 parts per 100 parts of rubbery copolymer.

It has now been found that considerably smaller amounts of carbon black suffice to obtain electrical conductivity without loss of a good processability, especially injection-mouldability, if use is made of a carbon black with an oil absorption (DPB absorption) of over 150 ml/100 g and a porosity index of over 100 m$^2$/g.

The process according to the invention is consequently characterized in that a mixture is made of 100 parts of rubbery copolymer of ethene, a higher α-alkene and, if so desired, one or more polyenes, 25 to 250 parts of substantially crystalline propene polymer and 1 to 25 parts of a carbon black with an oil (DBP) absorption of over 150 ml/100 g and a porosity index of over 100 m$^2$/g.

By preference, 50 and 250 parts of a substantially crystalline propene polymer and 1 to 17.5 especially 1 to 15, parts of carbon black are used for every 100 parts of rubbery polymer.

It has furthermore been found that the best combinations of electrical conductivity and good processability can be obtained if the ratio between the amount of substantially crystalline propene polymer and the amount of carbon black is greater than 6 and, preferably, greater than 10. For injection moulding, when a very good flow behaviour is required, a still higher ratio, preferably of at least 15, is chosen.

The substantially crystalline propene polymer (hereafter called crystalline propene polymer) may be any propene polymer with a crystallinity of over 25% by weight, in particular of over 40% by weight, measured by means of X-rays. Both homopolymers and copolymers with small amounts of other α-alkenes, such as ethene and butene, may be used.

The rubbery copolymer of ethene, a higher α-alkene and, if so desired, one or more polyenes, has little crystallinity, preferably less than 10% by weight. The ethene content may be varied from 30 to 85% by weight.

By preference, a mixture is prepared that consists of 100 parts of a thermoplastic elastomer composed of:
30–80% by weight of a substantially amorphous ethene-α-alkene copolymer with an X-ray crystallinity of less than 4% by weight and a tensile strength of at least 10 kg/cm$^2$ and 20–70% by weight of a substantially crystalline block copolymer of propene and ethene with an ethene content of between 1 and 25% by weight and an X-ray crystallinity of over 25% by weight, and
1 to 15 parts of carbon black with an oil absorption of over 150 ml per 100 g and a porosity index of over 100 m$^2$/g.

Compositions based on propene block copolymers show a better processability and a higher tensile strength than compositions in which propene homopolymers have been incorporated. The elastic properties are also better. By preference, the mixtures contain 30–65% by weight of the crystalline propene-ethene block copolymer.

The crystalline propene block copolymers, notably the so-called reactor block copolymers, may have been prepared by various methods that are well known in the art. In these methods, which are effected in a vehicle-which may be formed by liquid propene monomer-, a titanium trichloride compound is mainly used as a polymerization catalyst. This catalyst is prepared by reduction of titanium tetrachloride and/or grinding crystalline titanium trichloride, while other substances may be added to raise the activity and/or stereospecificity.

Before the polymerization a so-called activator must be added which consists of a metalorganic compound of a metal from groups I, II and/or III of the Periodic Table, in particular aluminium. Some examples of such activators are aluminium triethyl, diethyl aluminium chloride, ethyl aluminium dichloride, dibutyl magnesium, ethyl magnesium bromide, calcium hydride, butyl lithium, diethyl zinc, lithium aluminium hydride, and mixtures thereof.

Additives that raise the stereospecificity are, i.a., ethers, esters, alcoholates, tertiary amines and hydrides.

The preparation of the propene block copolymers is preferably started with the homopolymerization of propene, so that a propene polymer block with a crystallinity of over 40% is formed. Then ethene is added and an ethene polymer block is formed. If so desired, the cycle of propene polymerization and subsequent ethene polymerization may be repeated several times. It is advantageous fully or largely to free the polymerization reactor of unconverted propene monomer before ethene is fed to it. This may be done by allowing the propene under pressure to escape from the polymerization reactor and/or continuing the propene polymerization, in which propene is consumed, without addition of fresh propene.

According to the present invention preference is given to block copolymers that have been prepared by adding so much propene together with the ethene after the formation of the polypropene block that the polyethene block contains 0.1 to 15% by weight, in particular 0.5 to 10% by weight, of propene. The ethene polymerization can also be carried out partly as copolymerization with propene and partly as ethene homopolymerization. The total ethene content in the block copolymer amounts to 1 to 25% by weight, preferably 2.5 to 15% by weight, and, in particular, 5 to 10% by weight. If so desired, the polypropene block may contain small amounts of ethene. An ethene feed of 1 to 3% by volume during the entire propene polymerization or during part of it is possible. But preferably the polypropene block is a homopolymer block.

Also when the propene polymerization is followed by polymerization of a mixture of ethene and propene, preference is given to the removal of all or most of the unconverted propene.

During the entire polymerization or during part of it, especially during the (homo)polymerization of propene, hydrogen may be present to control the molecular weight.

Block copolymers with a so-called disturbed polythene block, i.e. in which propene has been polymerized together with the ethene, are to be prefered because of the interactions with the substantially amorphous copolymer of ethene and propene. These interactions are found to have a very favourable effect on the mechanical properties.

Block copolymers with a melt index (measured according to ASTM-D 1238 at 230° C., 2.16 kg) that ranges between 0.1 and 20 dg/min, especially between 0.5 and 10 dg/min are preferred in the mixtures according to the invention, as these values give the best compromises between mechanical properties and processability.

The block copolymers that are used according to the invention are substantially insoluble in boiling hexane. Only a minor amount of the block copolymer will dissolve. The amount of soluble polymer is less than 20% by weight, in particular less than 10% by weight, with respect to the total amount of block copolymer.

The amorphous rubbery ethene-$\alpha$-alkene copolymer is preferably a so-called EP or EPDM rubber consisting of ethene, propene, and, if so desired, one or more polyenes, such as dienes and trienes.

This ethene copolymer can be prepared by interpolymerization of a mixture of ethene, at least one other $\alpha$-alkene, and, if so desired, one or more polyenes in solution in an organic solvent which may or may not contain halogen or in suspension by means of a coordination catalyst.

The coordination catalyst used may be a catalyst formed by combining at least one compound of a metal from the sub-groups 4 through 6 or 8 of Mendeleev's Periodic Table, the so-called heavy-metal component, with a metal compound of a metal from groups 1 through 3 and main group 4 of this Periodic Table, the so-called aluminum component, if so desired in the presence of other substances, such as small amounts of compounds with free electron pairs, e.g. water, alcohol, oxygen, or Lewis bases, or small amounts of polyhalogenated organic compounds. Use is preferably made of a catalyst system that has been formed by combining vanadium and/or titanium compounds that are soluble in the vehicle, e.g. vanadium oxytrichloride and/or vanadium tetrachloride and/or titanium tetrachloride and/or tetra-alkyl titanate, with one or more organic aluminium compounds, such as aluminium trialkyls, dialkyl aluminium halogenide and/or mono-alkyl aluminium halogenide, dialkyl aluminium monohydride. Use is preferably made of those aluminium alkyl compounds that have an alkyl group with 2 to 8, in particular 2 to 5, carbon atoms.

Very good results are obtained with the combination of vanadium oxytrichloride and alkyl aluminium halogenides.

The ratio between the aluminium component and the heavy-metal component may be varied within wide limits, e.g. between 2:1 and 500:1, and, preferably, between 3:1 and 25:1. When the process is carried out in a continuous way, the catalyst components may fed directly to the polymerization zone in solution in the vehicle.

The other $\alpha$-alkene in the ethene copolymer may be any copolymerizable $\alpha$-alkene, but preferably those having 3 to 18 carbon atoms per molecule and, more in particular, 3 to 4 carbon atoms per molecule. Some examples of suitable $\alpha$-alkenes are butene, 4-methyl pentene-1, hexene, heptene, and especially propene. Also mixtures of $\alpha$-alkenes may have been incorporated in the ethene copolymers that may be used according to the invention, such as, e.g., propene and butene.

The polyenes to be used are preferably non-conjugated dienes. Usual dienes are dicyclopentadiene, 1,4-hexadiene, 1,5-hexadiene, ethylidene norbornene, norbornadiene, in general dienes with 4 to 16 carbon atoms, in particular 6 to 12 carbon atoms.

The copolymerization reaction is usually carried out at a temperature of between $-40°$ and 120° C., preferably between $-20°$ and 80° C. The pressure will usually be 1 to 50 atmospheres, but also higher or lower pressures may be used. By preference, the process is effected in a continuous way. The vehicle used may be any liquid that is inert with respect to the catalyst used. Use is preferably made of a hydrocarbon having 4 to 18 carbon atoms per molecule. Some examples of suitable hydrocarbons are saturated aliphatic and cyclo-aliphatic hydrocarbons, such as butane, pentane, cyclohexane, hexane, heptane, or petroleum fractions, aromatic hydrocarbons, such as, e.g., toluene and benzene and halogenated organic hydrocarbons, such as, e.g., tetrachloroethene.

It is profitable to effect the process at such a temperature and pressure that one or more of the monomers used, especially the $\alpha$-alkene, such as propene, is in the liquid state and is present in such quantity that it serves as the vehicle. Another vehicle will not be necessary then.

The molecular weight of the copolymers to be used in the process according to the invention can generally be affected by chain regulators, such as, e.g., acetylene, hydrogen, butadiene-1,2, zinc alkyls, and alkyl halogenides. The preferable chain regulator is hydrogen. The molecular weights of the rubbery copolymers usually range between $5 \times 10^4$ and $10^6$. 'Molecular weight' here denotes the weight-average molecular weight as determined by the light-scattering technique after removal of gel, if any. These copolymers, in the unvulcanized state, must preferably show a tensile strength (so-called green strength) of at least 10 kg/cm$^2$, but more preference is given to values of over 50 kg/cm$^2$. The tensile strength in the unvulcanized state highly increases with the ethene content in the copolymer. But at high ethene contents, the elastic properties deteriorate.

Consequently, copolymers with an ethene content of between 60 and 80, in particular 62 and 70% by weight are to be preferred. Another requirement is good processability of the copolymer and the mixtures thereof, which means that the viscosity of the rubbery copolymers must not be too high. By preference, the Mooney viscosity (125° (1+4)) ranges between 30 and 100. At lower values the elastic behaviour and the mechanical strength decrease. At higher values the processability of the thermoplastic elastomer becomes considerably poorer.

The crystalline polymer content in the substantially amorphous ethene-copolymer (hereafter called amorphous ethene copolymer) according to the invention must be lower than 4% by weight. By preference, this content is considerably lower, e.g. lower than 2.5% by weight, in particular lower than 1% by weight.

In the most preferable embodiment, the amorphous ethene-α-alkene copolymer shows a crystallinity ranging from very little to no longer detectable, e.g. of below 0.25%. Unless otherwise specified, crystallinity here denotes the crystallinity measured at room temperature by means of the well-known X-ray methods. Thanks to these low crystallinity values, the elastic properties of the mixtures will be very excellent. To obtain the best results, it is to be recommended to use an amorphous ethene-α-alkene copolymer with a DSC crystallization temperature of over +0° C., in particular over +5° C., and a heat of crystallization measured by the DSC technique of at least 6 cals/gram, in particular, at least 7 cals/gram. Hence, the amorphous ethene-propene copolymer preferably contains no or very little X-ray crystallinity, but it does contain a given amount of crystallizable polymer measured by the DSC method. Crystallization at over 50° C., however, is detrimental to the properties of the mixture, probably because the long ethene sequences proper to this crystallization do not give the desired favourable interactions with the polypropene block copolymer. By preference, no crystallization can here be detected at over 50° C. by means of the DSC technique. Hence, the start of the crystallization measured by DSC preferably ranges below 50° C.

The DSC curves have been run by means of a 'differential-scanning' calorimeter, put on the market by Perkin Elmer by the trade-name of Perkin Elmer DSC 2, on ethene-polymer samples of about 24 mg, which were heated tot 180° C. before determining the curves. The DSC crystallization thermogram was determined with a cooling rate of 5° C. per minute.

Before the measurements mentioned in this patent application were carried out, the temperature scale of the differential-scanning calorimeter had been calibrated by means of some reference substances. The melting temperatures obtained by heating these compounds at the rate of 5° C./minute were assumed to be equal to the equilibrium temperatures.

The type of carbon black to be used according to the invention must have a DBP (oil) absorption of over 150 ml/100 g and a porosity index of over 100 m$^2$/g. Use is preferably made of a type of carbon black that has a DBP absorption of over 200, in particular, of over 250 ml/100 g.

The DBP absorption is a well-known characteristic of carbon black that is determined by means of dibutyl phthalate according to ASTM D-2414.

The porosity index is the difference between the surface area of the carbon black measured by means of nitrogen and the area measured by means of cetyl trimethyl ammonium bromide (CTAB) (Cf. ASTM D 3037). This porosity index is preferably higher than 250, in particular higher than 400 m$^2$/g.

It is also advantageous to add an oil to the mixture. It has been found that this enables the amount of carbon black to be further reduced, which gives a surprisingly high improvement of the processability and also a surprisingly high increase of the conductivity. An amount of carbon black of only 5% of the polymer mixture increases the conductivity to a level that, in many cases, cannot be reached with 7% of carbon black when no oil is used. At the same time, a processability is obtained that is far better than that of mixtures without carbon black.

The amount of oil may be 5 to 100% by weight of the polymer mixture. But use is preferably made of 10 to 50, in particular 15 to 25, % by weight of oil.

The addition of oil is particularly attractive if use is made of mixtures in which over 50 parts of propene polymer per 100 parts of rubbery copolymer have been incorporated. It has been found that these mixtures, which have a much better processability, show mechanical properties that are comparable to those of mixtures without oil. The oils to be used according to the invention may be parafinnic, naphthenic, or aromatic oils. Suitable oils are the extender oils that are well-known for conventional rubbers, in particular the paraffinic or naphtenic extender oils.

If an oil is added to the mixture, a value considerably higher than 100 may be chosen for the Mooney viscosity of the rubbery copolymer. By preference, a value is chosen that is at least 120. However, the value of the Mooney viscosity and the amount of oil must be adjusted to each other so that, after mixing, the resulting value of the Mooney viscosity ranges between 30 and 100.

The mixtures according to the invention can be prepared by the methods that are well known for rubber and plastics by means of the usual apparatus, such as rollers, extruders, high speed rotation mixers, and kneaders, in which the material is subjected to shear forces at elevated temperature, in particular of between 170° and 200° C. For technical application on a larger scale preference is given to kneaders and extruders in which the mixing is effected at temperatures of about 175° to 195° C.

Improvement of the rigidity (i.e. modulus at 300% elongation) of the mixture can be achieved by replacing at least part of the rubbery ethene polymer in the mixture by a halogenated EPDM rubber. This halogenated EPDM rubber is preferably prepared by the process described in U.S. Pat. No. 3,936,430.

In cases where a good electrical conductivity is required, the mixtures according to the invention can be used with a minimum amount of black, so that the processability remains good.

These mixtures are used, for instance, for the manufacture of cables. For various types of cables that are used for electrical conduction, it is important to include also an elastomeric, conducting layer in the cable. The mixtures according to the invention are particularly suitable for this use, since they retain their suitability both at high (100° C.) and at low (−60° C.) temperatures.

The insulating layer of the cable that is also necessary can profitably be made of a similar, non-conducting mixture.

The mixtures according to the invention can also be used for the manufacture of moulded articles that must be lacquered electrostatically, such as, e.g., parts of motor-cars, including bumpers and cover strips.

A good processability and a good conductivity are generally of great importance for these applications.

Mixtures with a great hardness and stiffness, i.e. in which 50 to 70% by weight of propene polymer with respect to the total of polymers is present, require only little carbon black to obtain a good conductivity. For these mixtures the black content is preferably smaller than 10 parts per 100 parts of polymer. Consequently, these mixtures deserve special preference for applications in which hardness and stiffness are desired.

EXAMPLE I

A mixture was made of a rubbery ethene propene ethylidenenorbornene terpolymer and a crystalline polypropene block copolymer.

The rubbery terpolymer contained 67% by weight of ethene, 28% by weight of propene, and 5% by weight of ethylidene norbornene.

The content of crystalline material was 1.2% by weight and the tensile strength was 54 kg/cm$^2$.

The Mooney viscosity ML (1+4) at 125° C. was 54.5.

The DSC peak temperature was at +10° C. and the heat of crystallization measured by means of DSC was 10 cals/g. Crystallization set in at 49° C. The crystalline polypropene block copolymer contained 6% by weight of ethene and was constituted of a propene homopolymer block to which an ethene copolymer block containing a small amount of propene is attached. The content of crystalline material was over 50% by weight. The melt index measured at 230° C. and 2.16 kg was 5.6 dg/minute. The polymer contained 3.0% by weight of hexane-soluble material.

The polymer mixtures were then mixed with a carbon black that had the following properties:

| DBP absorption | 350 cm$^3$/100 g |
|---|---|
| particle size | 30 μm |
| surface area (CTAB) | 480 m$^2$/g |
| porosity index | 449 |
| surface area (N$_2$) | 929 m$^2$/g |

4 mixtures (A, B, C, and D) of the rubbery terpolymer and the propene block copolymer were prepared, the respective ratios being 75/25, 65/35, 50/50 and 40/60.

These mixtures were then mixed with 5, 7 and 10 parts of carbon black per 100 parts of polymer mixtures. The properties of these mixtures are compiled in the following table, where I$_{10}$ (190° C.) is the melt index at 190° C. and a 10-kg load measured according to ASTM D 1238.

| polymer-mixture | parts of black carbon | log. volume resistance ohm . cm | I$_{10}$ (190° C.) g/min | PP carbon black ratio |
|---|---|---|---|---|
| A | 1 | 0 | 16 | 0.12 | — |
|   | 2 | 5 | 13 | 0.04 | 7 |
|   | 3 | 7 | 8 | 0.04 | 5 |
|   | 4 | 10 | 6 | 0.01 | 3,3 |
| B | 1 | 0 | 17 | 0.34 | — |
|   | 2 | 5 | 14 | 0.08 | 11 |
|   | 3 | 7 | 6 | 0.05 | 6 |
|   | 4 | 10 | 5 | 0.03 | 5,4 |
| C | 1 | 0 | 16 | 1.32 | — |
|   | 2 | 5 | 14 | 0.29 | 20 |
|   | 3 | 7 | 6 | 0.15 | 15 |
|   | 4 | 10 | 5 | 0.05 | 10 |
| D | 1 | 0 | 16 | 2.20 | — |
|   | 2 | 5 | 10 | 0.45 | 30 |
|   | 3 | 7 | 6 | 0.21 | 21 |
|   | 4 | 10 | 5 | 0.06 | 15 |

These results show that a good flow is obtained when the ratio of the amount of polypropene to the amount of carbon black is greater than 10, in particular, greater than 15. It furthermore appears that over 5 parts of carbon black are required to obtained a proper conductivity. The use of 10 parts of carbon black or more is not necessary, as the conductivity increases only little, while the processability strongly decreases.

The best results are obtained with the use of about 7 parts of carbon black and over 100 parts of propene polymer per 100 parts of rubbery ethene polymer.

EXAMPLE II

A mixture was made of 100 parts of a rubbery ethene propene dicyclopentadiene terpolymer consisting of about 50% by weight of napthenic oil and 100 parts of a polypropene block copolymer as used in Example I.

The terpolymer rubber contained 67% by weight of ethene, 29% by weight of propene and 4% by weight of dicyclopentadiene. The content of crystalline material was 2.0% by weight, the tensile strength was 120 kg/cm$^2$. Other characteristics:

| Mooney viscosity ML (1 + 4) 125° C. | 140 |
|---|---|
| DSC peak temperature | 15° C. |
| Heat of crystallization | 7.0 Cals/g |
| Start of crystallization | 47° C. |

The polymer mixture (100 parts) was mixed with 5, 7 and 10 parts of carbon black.

The results of the tests are compiled in the table.

| parts of carbon black | log. volume resistance ohm . cm | I$_{10}$ 190° C. g/min. | PP carbon black ratio |
|---|---|---|---|
| 0 | 16 | 12.0 | — |
| 5 | 7 | 2.4 | 40 |
| 7 | 5 | 0.87 | 30 |
| 10 | 4 | 0.10 | 20 |

These values show that, when oil is used, only 5 parts of carbon black suffice to obtain a good conductivity and, at the same time, a very good processability.

We claim:

1. A process for preparing an electrically conducting, thermoplastic elastomer mixture by forming a mixture comprising in parts by weight:
   (a) about 100 parts of a thermoplastic elastomer composed of:
      (i) 30% to 80% by weight of a substantially amorphous ethene-α-alkene copolymer having an X-ray crystallinity of less than 4% by weight and a tensile strength of at least 10 kg/cm$^2$, and
      (ii) 20% to 70% by weight of a substantially crystalline block copolymer of propene and ethene having an ethene content of between 1 and 25% by weight and an X-ray crystallinity greater than 25% by weight, and
   (b) from about 1 to about 15 parts of carbon black having an oil (DBP) absorption greater than 200 ml/100 g and a porosity index greater than 100 m$^2$/g.

2. The process according to claim 1 wherein the amorphous ethene-α-alkene copolymer has an X-ray crystallinity less than about 0.25%.

3. The process according to claim 1 wherein said carbon black has an oil (DBP) absorption greater than 250 ml/100 g and a porosity index greater than 400 m$^2$/g.

4. An electrically conducting thermoplastic elastomeric composition consisting essentially of:
   A. 100 parts of a rubbery ethene-α-alkene copolymer,
   B. 25 to 250 parts of a substantially crystalline propene polymer, and C. 1 to 25 parts of carbon black having an oil (DBP) absorption greater than 200 ml/100 g and a porosity index of greater than 100 m²/g, and wherein the ratio of the amount of propene polymer (B) to the amount of carbon black (C) is at least 6.

5. A process for preparing an electrically conducting thermoplastic elastomer composition by forming a mixture comprising;
  A. 100 parts of a rubbery ethene-α-alkene copolymer,
  B. 25 to 250 parts of a substantially crystalline propene polymer, and
  C. 1 to 25 parts of a carbon black having an oil (DBP) absorption greater than 200 ml/100 g, and a porosity index of greater than 100 m²/g, and wherein the ratio of the amount of propene polymer (b) to the amount of carbon black (c) is at least 6.

6. Process according to claim 5 wherein said rubbery ethene-α-alkene copolymer also contains at least one polyene.

7. Process according to claim 5 wherein the mixture contains 50 to 250 parts of the propene polymer and 1 to 17.5 parts of carbon black.

8. Process according to claim 7 wherein the mixture contains 1 to 15 parts of carbon black.

9. Process according to claim 5 wherein said ratio is at least 10.

10. Process according to claim 9 wherein said ratio is at least 15.

11. Process according to claim 5 wherein the mixture also contains an extender oil in an amount of 5 to 100% by weight relative to the polymer mixture.

12. Process according to claim 6 wherein the carbon black has an oil (DSP) absorption greater than 250 ml/100 g.

13. Process according to claim 5 wherein the carbon black has a porosity index greater tha 250 m²/g.

14. Process according to claim 13 wherein said porosity index is greater than 400 m²/g.

15. The process according to claim 6 wherein said carbon black has an oil (DBP) absorption greater than 250 ml/100 g and a porosity index greater than 400 m²/g.

16. The elastomeric composition according to claim 4 wherein said ethylene-α-alkene copolymer also contains at least one polyene.

17. The elastomeric composition according to claim 4 further including:
  D. an extender oil in an amount of from 5 to 100% by weight of the total of components A plus B.

18. An electrically conducting thermoplastic elastometric composition consisting essentially of:
  (a) about 100 parts by weight of a thermoplastic elastomer composed of:
    (i) 30% to 80% by weight of a substantially amorphous ethene-α-alkene copolymer having an X-ray crystallinity of less than 4% by weight and a tensile strength of at least 10 kg/cm², and
    (ii) 20% to 70% by weight of a substantially crystalline block copolymer of propene and ethene having an ethene content of between 1 and 25% by weight and an X-ray crystallinity greater than 25% by weight; and
  (b) from about 1 to about 15 parts by weight of carbon black having an oil (DBP) absorption greater than 200 ml/100 g and a porosity index greater than 100 m²/g.

* * * * *